(12) United States Patent
MacDonald

(10) Patent No.: US 12,241,791 B2
(45) Date of Patent: Mar. 4, 2025

(54) SYSTEMS AND METHODS FOR PHASE DIFFERENCE DETECTION AND CONTROL OF ELECTROMAGNETIC ARRAYS

(71) Applicant: Kenneth R. MacDonald, Sandia Park, NM (US)

(72) Inventor: Kenneth R. MacDonald, Sandia Park, NM (US)

( * ) Notice: Subject to any disclaimer, the term of this patent is extended or adjusted under 35 U.S.C. 154(b) by 1052 days.

(21) Appl. No.: 17/147,014

(22) Filed: Jan. 12, 2021

(65) Prior Publication Data

US 2021/0215544 A1 Jul. 15, 2021

Related U.S. Application Data

(60) Provisional application No. 62/960,645, filed on Jan. 13, 2020.

(51) Int. Cl.
*G01J 9/02* (2006.01)
*H01S 3/10* (2006.01)
(Continued)

(52) U.S. Cl.
CPC ............ *G01J 9/02* (2013.01); *H01S 3/10053* (2013.01); *H01S 3/2308* (2013.01); *H01S 3/2383* (2013.01)

(58) Field of Classification Search
CPC ...... G01J 9/02; H01S 3/10053; H01S 3/2308; H01S 3/2383; H01S 3/06754; H01S 3/10069; H01S 3/1307; H01S 3/1305
See application file for complete search history.

(56) References Cited

U.S. PATENT DOCUMENTS 5,187,538 A * 2/1993 Iwamoto ................. G01S 11/12
356/450
6,708,003 B1 * 3/2004 Wickham ............ H04B 10/1121
398/161
(Continued)

OTHER PUBLICATIONS

Acebrón, Juan A. et al. "The Kuramoto model: A simple paradigm for synchronization phenomena", Reviews of Modern Physics, vol. 77, Jan. 2005, 44 pgs.
(Continued)

*Primary Examiner* — Xinning(Tom) Niu
(74) *Attorney, Agent, or Firm* — LOZA & LOZA, LLP; Richard H. Krukar

(57) ABSTRACT

A combined beam having a desired wavefront is produced from a first electromagnetic beam propagating in a beam direction and a second electromagnetic beam propagating in the beam direction and interfering with the first electromagnetic beam in an interference region. A first power measurement indicates a first combined power of the first electromagnetic beam and the second electromagnetic beam at a first sample point in the interference region. A second power measurement indicates a second combined power of the first electromagnetic beam and the second electromagnetic beam at a second sample point in the interference region. A phase difference between the first electromagnetic beam and the second electromagnetic beam is determined using the first power measurement and the second power measurement. The phase of the first beam can be changed based on the phase difference to produce the combined beam that has the desired wavefront.

20 Claims, 12 Drawing Sheets

(51) Int. Cl.
*H01S 3/13* (2006.01)
*H01S 3/23* (2006.01)

(56) References Cited

U.S. PATENT DOCUMENTS

| | | | |
|---|---|---|---|
| 7,058,098 B1* | 6/2006 | Shay | H01S 3/2383 |
| | | | 372/29.016 |
| 7,233,433 B1 | 6/2007 | Shay | |
| 8,503,070 B1 | 8/2013 | Henry et al. | |
| 8,548,017 B1 | 10/2013 | O'Loughlin et al. | |
| 9,134,538 B1 | 9/2015 | Augst et al. | |
| 9,362,710 B1 | 6/2016 | Goodno | |
| 9,454,004 B2 | 9/2016 | Beresnev et al. | |
| 2005/0135815 A1* | 6/2005 | Gerwe | H01S 3/2383 |
| | | | 398/188 |
| 2007/0201795 A1* | 8/2007 | Rice | H01S 3/005 |
| | | | 385/39 |

OTHER PUBLICATIONS

Fried, David L., "Least-square fitting a wave-front distortion estimate to an array of phase-difference measurements", J. Opt. Soc. Am., vol. 67, No. 3, Mar. 1977, 6 pgs.

Pulford, Benjamin N., "LOCSET Phase Locking: Operation, Diagnostics, and Applications", Dissertation, Doctor of Philosophy, Optical Science and Engineering, The University of New Mexico Dec. 2011, 212 pgs.

Nesche, Brendan, "Phase Dynamics of LOCSET Control Methodology", A Thesis Presented for the Master of Science Degree, The University of Tennessee, Knoxville, May 2015, 47 pgs.

Redmond, Shawn et al. "Active Coherent Combination Using Hill Climbing-Based Algorithms for Fiber and Semiconductor Amplifiers", Coherent Laser Beam Combining, A. Brignon, ed., Wiley-VCH Verlag Gmbh & Co., (2013), Chapter 4, 34 pgs.

Zhou, P. et al. "Coherent Beam Combining of Fiber Amplifiers Using Stochastic Parallel Gradient Descent Algorithm and Its Application", IEEE Journal of Selected Topics in Quantum Electronics, 15, 248, (2009), p. 248-256.

* cited by examiner

SYSTEMS AND METHODS FOR PHASE DIFFERENCE DETECTION AND CONTROL OF ELECTROMAGNETIC ARRAYS

CROSS REFERENCE TO RELATED APPLICATIONS

This patent application claims the priority and benefit of U.S. provisional patent application No. 62/960,645, titled "Near-Field Phase-Difference Detection and Control in Coherent Short-Wavelength Electromagnetic Arrays," filed on Jan. 13, 2020, which is herein incorporated by reference in its entirety.

TECHNICAL FIELD

Electromagnetic beams, arrays of electromagnetic beams, laser beams, arrays of laser beams, interference patterns, interference pattern measurement, phase correction, constructive interference, destructive interference, and changing sub-beam phases to obtain a desired wavefront for an electromagnetic beam that includes multiple sub beams.

BACKGROUND

One method of producing a powerful laser beam is to combine a number of less powerful laser beams. In some implementations, an input laser beam is split into numerous seed beams that are amplified and then emitted as an array of substantially parallel beams.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method for producing a combined beam that has a desired wavefront. The method can include producing a first electromagnetic beam that is propagating in a beam direction, producing a second electromagnetic beam that is propagating in the beam direction and interferes with the first electromagnetic beam in an interference region, obtaining a first power measurement indicating a first combined power of the first electromagnetic beam and the second electromagnetic beam at a first sample point in the interference region, obtaining a second power measurement indicating a second combined power of the first electromagnetic beam and the second electromagnetic beam at a second sample point in the interference region, determining a phase difference between the first electromagnetic beam and the second electromagnetic beam using the first power measurement and the second power measurement, and changing a first beam phase of the first electromagnetic beam based on the phase difference to produce the combined beam that has the desired wavefront.

Another aspect of the subject matter described in this disclosure can be implemented by a system. The network appliance can include a beam forming optics configured for producing a first electromagnetic beam that is propagating in a beam direction and to produce a second electromagnetic beam that is propagating in the beam direction and interferes with the first electromagnetic beam in an interference region, a first detector configured for obtaining a first power measurement indicating a first combined power of the first electromagnetic beam and the second electromagnetic beam at a first sample point in the interference region, a second detector configured for obtaining a second power measurement indicating a second combined power of the first electromagnetic beam and the second electromagnetic beam at a second sample point in the interference region, a processing device configured for using the first power measurement and the second power measurement to determine a phase difference between the first electromagnetic beam and the second electromagnetic beam, and a phase changer configured for changing a first beam phase of the first electromagnetic beam based on the phase difference to produce a combined beam that has a predetermined wavefront.

Yet another aspect of the subject matter described in this disclosure can be implemented by a system. The system can include a means for producing a first electromagnetic beam, a means for producing a second electromagnetic beam, a means for obtaining a first power measurement indicating a first combined power at a first sample point in an interference region of the first electromagnetic beam and the second electromagnetic beam, a means for obtaining a second power measurement indicating a second combined power at a second sample point in the interference region of the first electromagnetic beam and the second electromagnetic beam, and a means for producing a combined beam that has a predetermined wavefront and that includes the first electromagnetic beam and the second electromagnetic beam.

In some implementations of the methods and devices, the phase difference is determined using a difference between the first power measurement and the second power measurement. In some implementations of the methods and devices, the method can include splitting an input signal to produce a first seed signal and a second seed signal, amplifying the first seed signal to produce the first electromagnetic beam, and amplifying the second seed signal to produce the second electromagnetic beam.

In some implementations of the methods and devices, the method can include splitting an input coherent light signal to produce a first seed signal and a second seed signal, amplifying the first seed signal to produce the first electromagnetic beam, and amplifying the second seed signal to produce the electromagnetic second beam. In some implementations of the methods and devices, the method can include providing a phase adjustment signal based on the phase difference to an optical phase changer, and passing the first seed signal through the optical phase changer, wherein the optical phase changer changes a first seed signal phase of the first seed signal. In some implementations of the methods and devices, a first fiber amplifier amplifies the first seed signal and a second fiber amplifier amplifies the second seed signal. In some implementations of the methods and devices, the method can include using a sampling optic to direct at least one sampling beam to at least two detectors, and using the at least two detectors to determine the first power measurement and the second power measurement.

In some implementations of the methods and devices, at least four electromagnetic beams propagating in the beam direction are produced, the first electromagnetic beam and the second electromagnetic beam are two of the at least four electromagnetic beams, a plurality of phase differences is determined based on a plurality of power measurement pairs, and at least three beam phases of the at least four electromagnetic beams are adjusted based on the phase differences to produce the combined beam with the desired wavefront. In some implementations of the methods and devices, the system can include a first amplifier configured for producing the first electromagnetic beam by amplifying a first seed signal obtained from an input signal, and a second amplifier configured for producing the second electromagnetic beam by amplifying a second seed signal obtained from the input signal.

In some implementations of the methods and devices, the system can include a first amplifier configured for producing the first electromagnetic beam by amplifying a first seed signal obtained from an input coherent light signal, and a second amplifier configured for producing the second electromagnetic beam by amplifying a second seed signal obtained from the input coherent light signal. In some implementations of the methods and devices, the phase changer is an optical phase changer configured for changing the first beam phase using a phase adjustment signal based on the phase difference. In some implementations of the methods and devices, the first amplifier is a first fiber amplifier; and the second amplifier is a second fiber amplifier. In some implementations of the methods and devices, the system includes a sampling optic configured for directing at least one sampling beam to the first detector and to the second detector.

In some implementations of the methods and devices, the system can include a means for amplifying a plurality of seed signals to produce a plurality of electromagnetic beams, wherein the first electromagnetic beam and the second electromagnetic beam are two of the electromagnetic beams. In some implementations of the methods and devices, the first electromagnetic beam is a laser beam and the second electromagnetic beam is another laser beam. In some implementations of the methods and devices, the combined beam includes at least ten phase adjusted laser beams.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
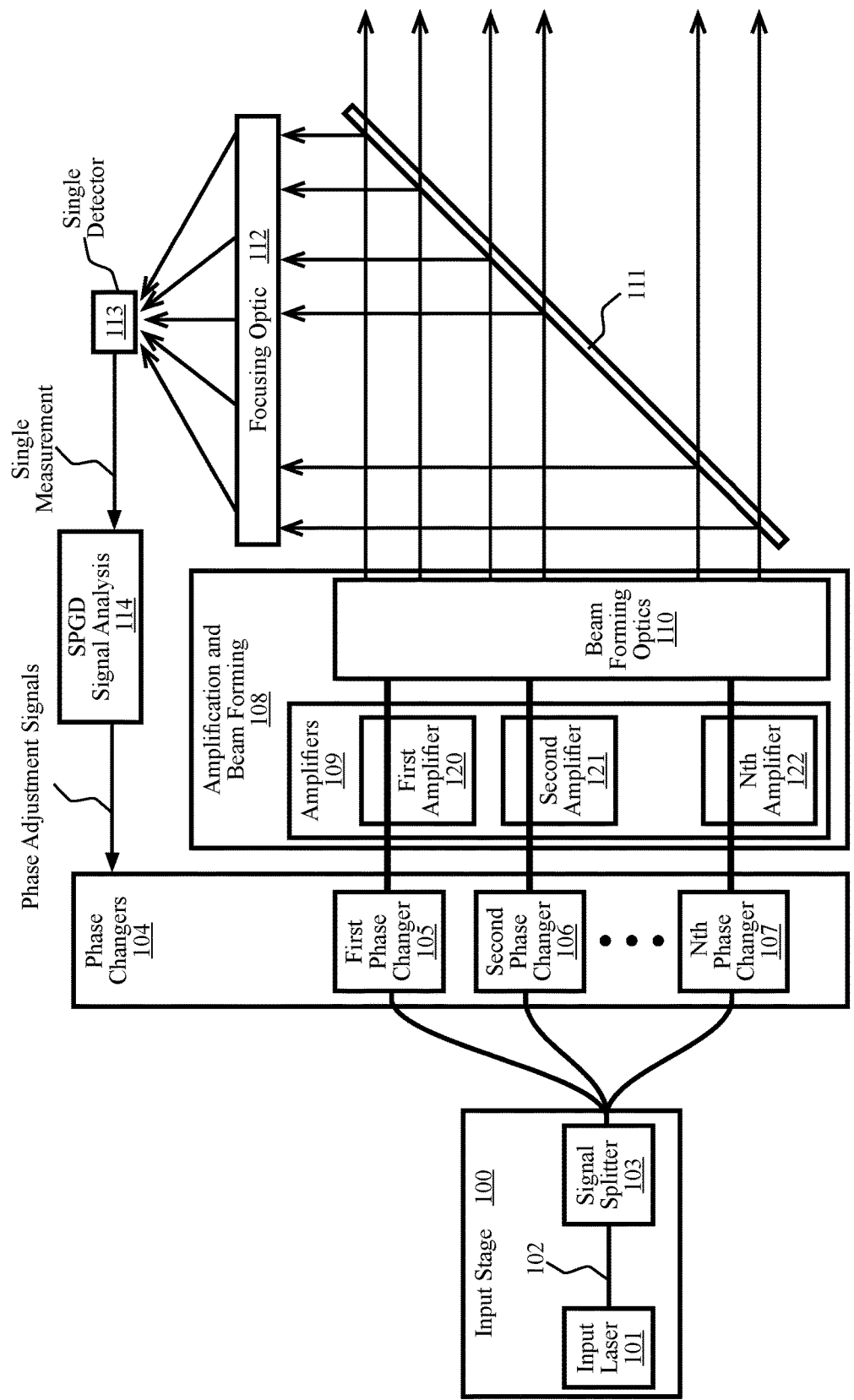
FIG. 1, labeled as prior art, is a high-level block diagram illustrating a Stochastic Parallel Gradient Descent (SPGD) or hill climbing technique that combines sub-beams.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Powerful electromagnetic beams can be created by combining numerous less powerful beams. One particular application is producing a powerful laser beam by combining laser beams that are less powerful. Without losing generality, embodiments that combine laser beams are disclosed with the understanding that the techniques may be used to combine electromagnetic beams having other frequencies.

Two of the challenges of producing a combined beam from other electromagnetic beams can include matching the frequencies of the electromagnetic beams and giving the combined beam a desired wavefront. One method of ensuring that laser beams have the same frequency is to split an input beam into seed beams and to amplify the seed beams. The amplified seed beams, all having the same frequency, can then be combined. Such a combined beam, however, can include numerous beams having different phases. As such, the wavefront of the combined beam can be unpredictable and is highly unlikely to have any desired wavefront.

Techniques using a single photodetector for obtaining a desired wavefront have been developed. In general, those techniques may be applied when the desired wavefront is substantially planar in a plane normal to the combined beam's direction of propagation. Those techniques may iteratively change sub-beam phases and, ideally, converge on the desired wavefront.

The embodiments described herein provide advancements over the prior art by using numerous detectors that measure the combined beam's power at a number of sample points. The measurements are then analyzed and the phases of the beams being combined are changed such that the combined beam has the desired wavefront. One of the advantages is that the embodiments can produce the desired wavefront in a single step instead of over many iterations. Another advantage is that different desired wavefronts can be obtained programmatically whereas other techniques may require changing the sampling optic.

FIG. 1, labeled as prior art, is a high-level block diagram illustrating a Stochastic Parallel Gradient Descent (SPGD) or hill climbing technique that combines sub-beams. The input stage 100 has an input laser 101 that produces an input beam 102. Signal splitter 103 splits the input beam 102 into N seed beams. For example, the input beam can be a coherent light signal such as a laser beam and the signal splitter can be a beam splitter. Amplification and beam forming optics 108 produce a combined beam from the N seed beams. The amplification and beam forming optics 108 include amplifiers 109 and beam forming optics 110. The amplifiers 109 can be fiber amplifiers or some other type of amplifier that amplifies the seed beams to produce the sub-beams. The beam forming optics can give each of the sub-beams a specific wavefront. For example, if the desired wavefront is flat, then each of the sub-beams can have a flat wavefront. Each of those sub-beam wavefronts, however, can be at a different phase.

The phases of the sub beams can be changed by changing the phases of the seed beams with a phase changer. Each of the seed beams passes through a phase changer and an amplifier. The first seed beam is fed into the first phase changer 105 and is then amplified by the first amplifier 120. The second seed beam is fed into the second phase changer 106 and is then amplified by the second amplifier 121. The Nth seed beam is fed into the Nth phase changer 107 and is then amplified by the Nth amplifier 122.

The beam forming optics can produce a combined beam that passes through a sampling optic 111 that redirects a portion of the combined beam to a focusing optic 112. The focusing optic 112 focuses the beam onto a single detector 113 that produces a measurement of the beam's total power. Note that some teachings may indicate that a detector measures intensity or that a calculation yields intensity. Intensity is understood to be the power per unit area. As such, those practiced in the art know that the terms power and intensity may be used interchangeably. The single detector 113 produces a single measurement that is provided to SPGD signal analysis 114. SPGD signal analysis 114 can output phase adjustment signals to the phase changers. The SPGD algorithm can compare a current measurement to a previous measurement to determine if the current measurement is greater than or less than the previous measurement. Typically, the SPGD algorithm iteratively adjusts the phase changers 104 to maximize the single measurement.

Figure 2:
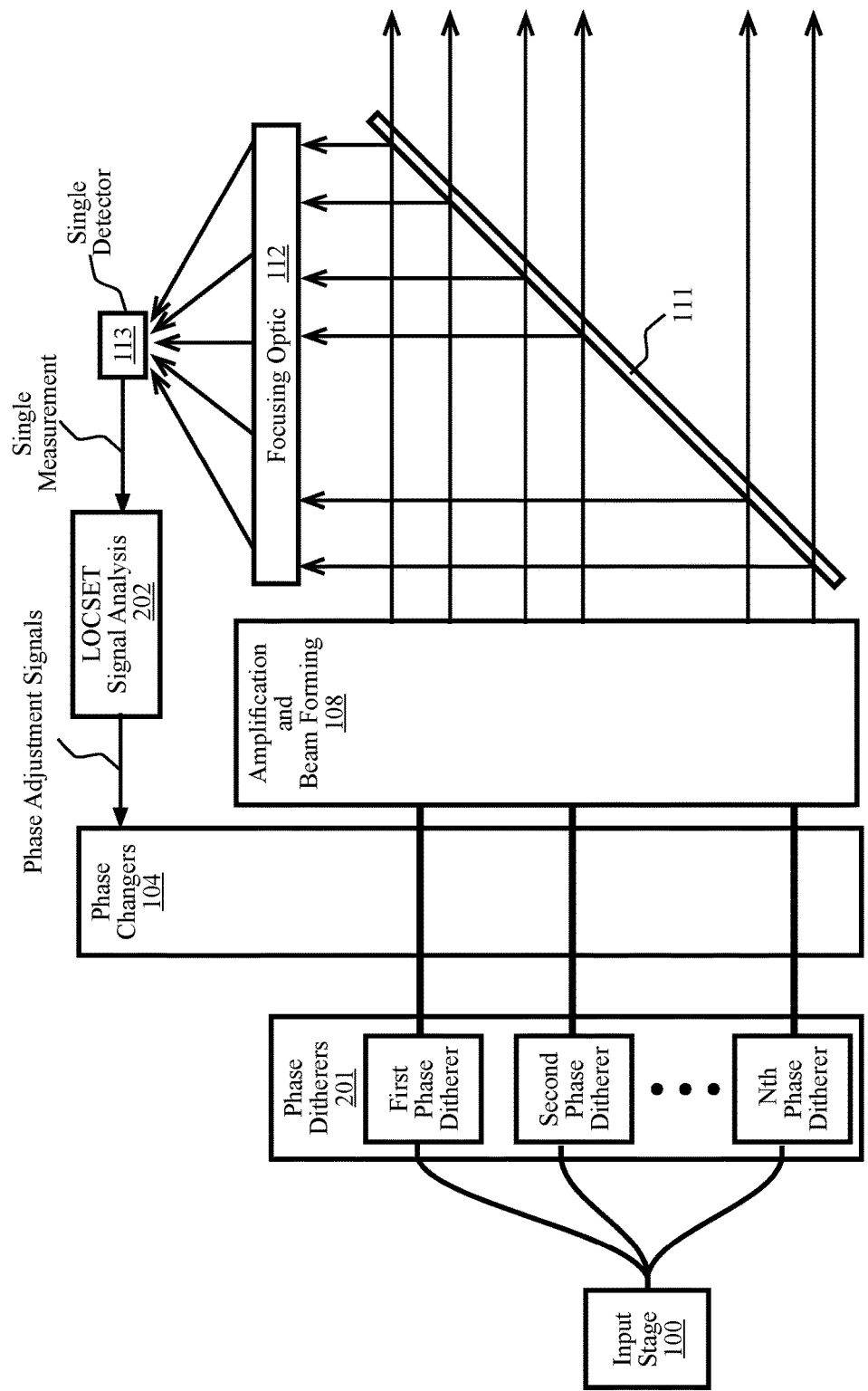
FIG. 2, labeled as prior art, is a high-level block diagram illustrating a Locking of Optical Coherence via Single-detector Electronic-frequency Tagging (LOCSET) technique that combines sub-beams.

FIG. 2, labeled as prior art, is a high-level block diagram illustrating a Locking of Optical Coherence via Single-detector Electronic-frequency Tagging (LOCSET) technique that combines sub-beams. Comparing FIG. 2 to FIG. 1, it is seen that the LOCSET technique introduces phase ditherers 201 and uses LOCSET signal analysis 202 instead of SPGD signal analysis 114. The phase ditherers 201 modulate the seed beams such that the phases of the sub-beams are modulated. Each sub-beam has a different modulation. The single detector 113 takes a series of single measurements over time. The series of single measurements can be analyzed to isolate the contribution of each sub-beam. The phase changers 104 can be varied algorithmically to increase each sub-beam's contribution.

Figure 3:
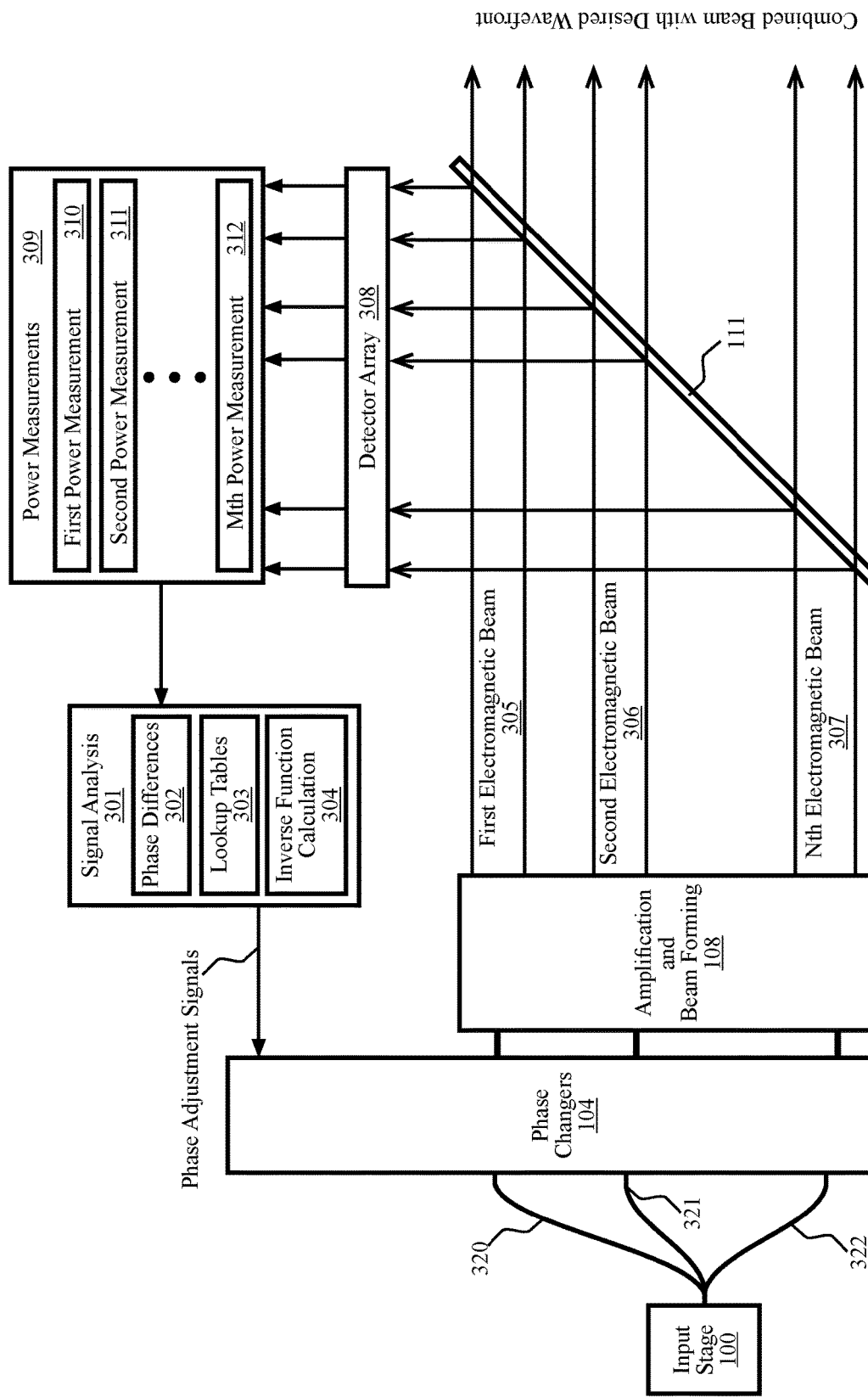
FIG. 3 is a high-level block diagram illustrating a system that uses power measurements in interference regions to produce a combined beam that has a desired wavefront according to some aspects.

FIG. 3 is a high-level block diagram illustrating a system that uses power measurements in interference regions to produce a combined beam that has a desired wavefront according to some aspects. The input stage 100 produces seed signals (e.g., seed laser beams) such as a first seed signal 320, a second seed signal 321, and an Nth seed signal 322. The seed signals pass through phase changers 104 and amplification and beam forming 108. The combined beam produced by amplification and beam forming 108 includes a first electromagnetic beam 305, a second electromagnetic beam 306, and an Nth electromagnetic beam 307. The first electromagnetic beam 305 can be the result of amplifying and adjusting the phase of the first seed beam 320. The second electromagnetic beam 306 can be the result of amplifying and adjusting the phase of the second seed beam 321. The Nth electromagnetic beam 307 can be the result of amplifying and adjusting the phase of the Nth seed beam 322. The sampling optic 111 can direct at least one sampling beam to a detector array 308. The sampling optic 111 may be a partially reflecting plate that directs a single sampling beam to the detector array 308. The detector array 308 can have numerous detectors. For example, a charge coupled device (CCD) array can have millions of photodetectors. The detector array can measure the power of the combined beam at a number of sample points. The power measurements 309 can include a first power measurement 310, a second power measurement 311, and an Mth power measurement 312. The first power measurement 310 can indicate the combined power of the sub-beams at a first sample point. The second power measurement 311 can indicate the combined power of the sub-beams at a second sample point. The Mth power measurement 312 can indicate the combined power of the sub-beams at a Mth sample point.

Signal analysis 301 can use the power measurements 309 to determine phase differences 302. Phase adjustment signals based on the phase differences 302 can be sent to the phase changers 104 such that the combined beam has the desired wavefront. The phase differences can be determined using lookup tables 303, inverse function calculations 304, or via some other method.

Other embodiments can use a patterned sampling optic that directs multiple sampling beams to the detector array 308. For example, a non-patterned sampling optic can be partially reflecting across its entire surface. A patterned sampling optic may have a small number of reflective spots with each reflective spot directing a sampling beam to the detector array 308. A patterned sampling optic can be produced from a non-patterned sampling optic via a process that leaves the reflective layer at only a small number of reflective spots.

Figure 4:
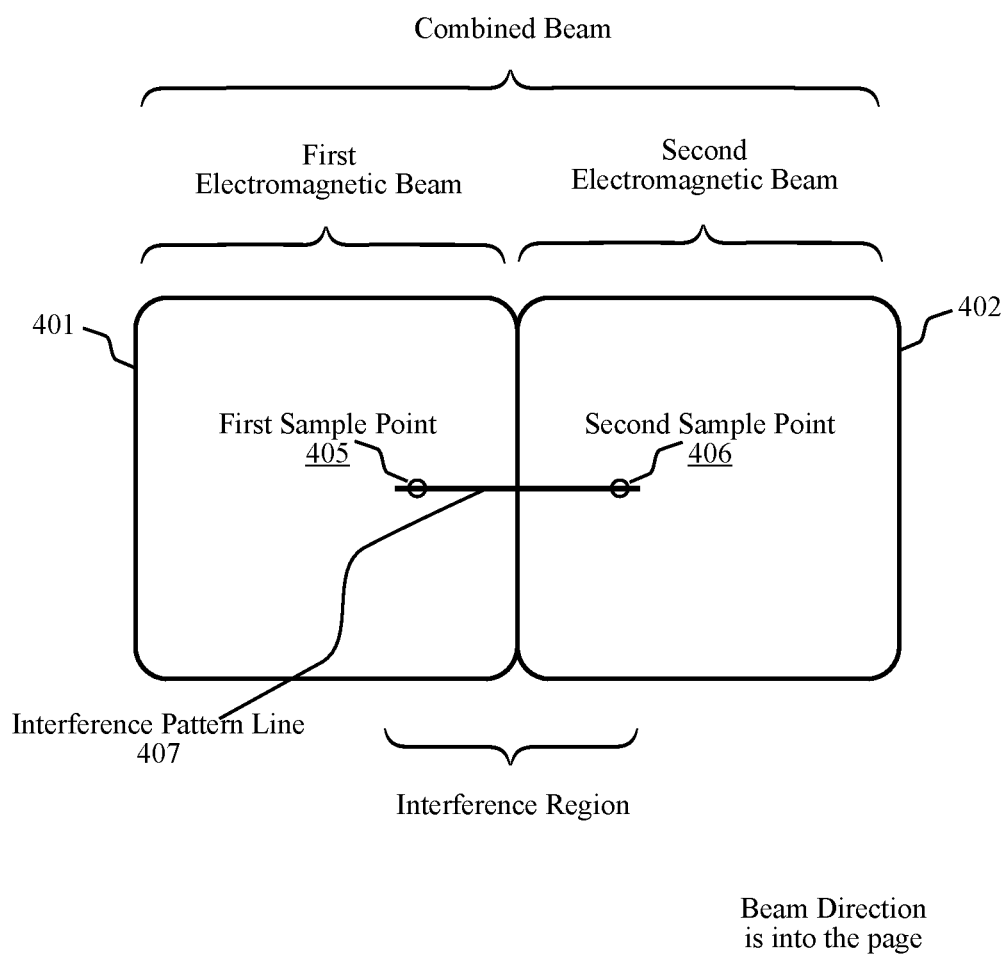
FIG. 4 illustrates sampling points in the interference region of a first electromagnetic beam and a second electromagnetic beam according to some aspects.

FIG. 4 illustrates sampling points 405, 406 in the interference region of a first electromagnetic beam 401 and a second electromagnetic beam 402 according to some aspects. The first electromagnetic beam 401 and the second electromagnetic beam 402 interfere in an interference region along a boundary between electromagnetic beams. The interference produces an observable interference pattern. Here, the electromagnetic beams may be propagating into the page. An interference pattern line 407 through the interference region can be used to graphically show the interference pattern between the electromagnetic beams.

Figure 5:
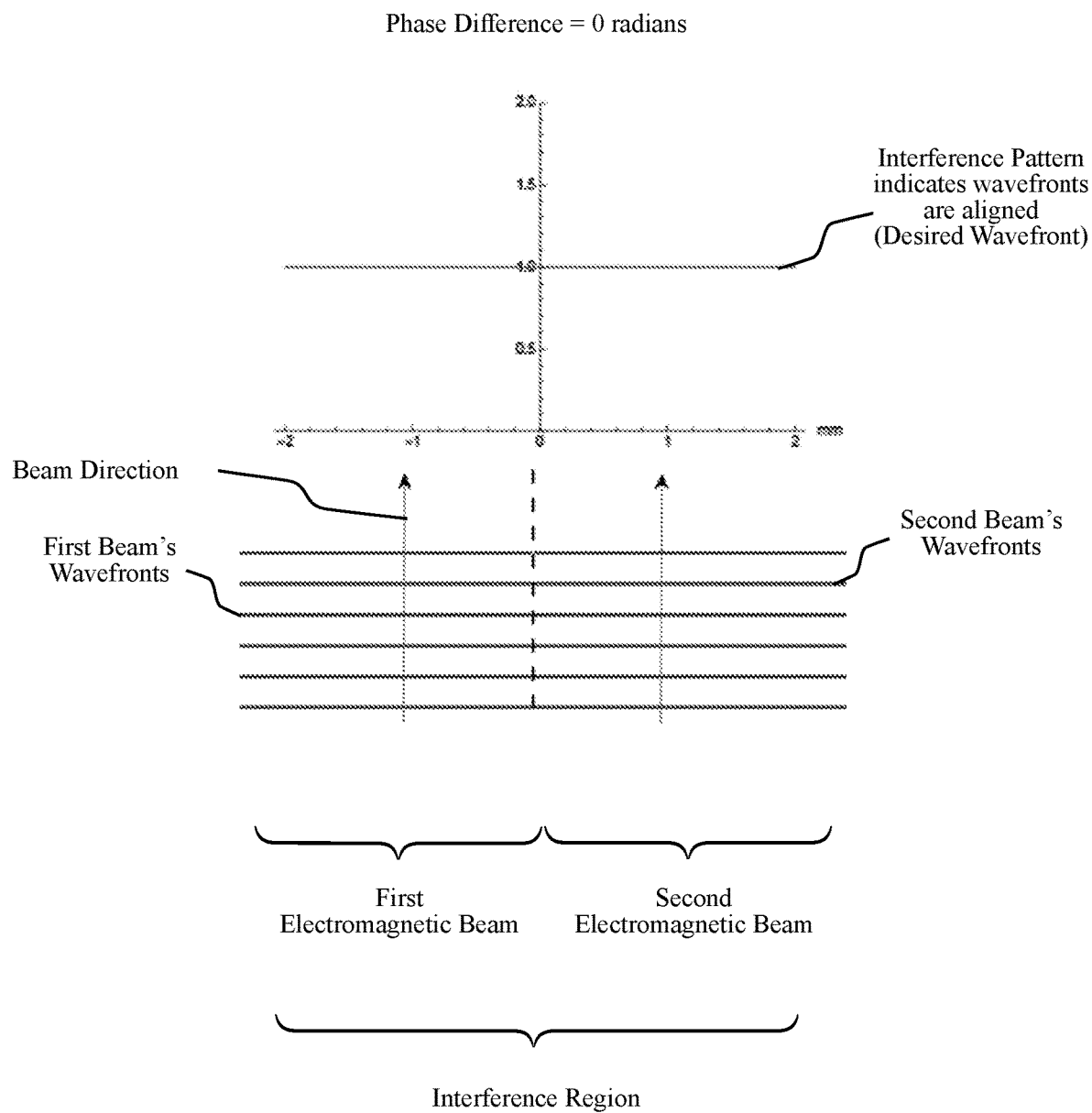
FIG. 5 illustrates an interference pattern in a wavefront for two electromagnetic beams with a phase difference of 0 radians according to some aspects.

FIG. 5 illustrates an interference pattern in a wavefront for two electromagnetic beams with a zero phase difference according to some aspects. Here, the desired wavefront is flat, as can be seen in the flat wavefronts of the first electromagnetic beam and the second electromagnetic beam. The phase difference between the first electromagnetic beam and the second electromagnetic beam is 0.0 radians. As such the interference pattern is constant along the interference pattern line 407.

Figure 6:
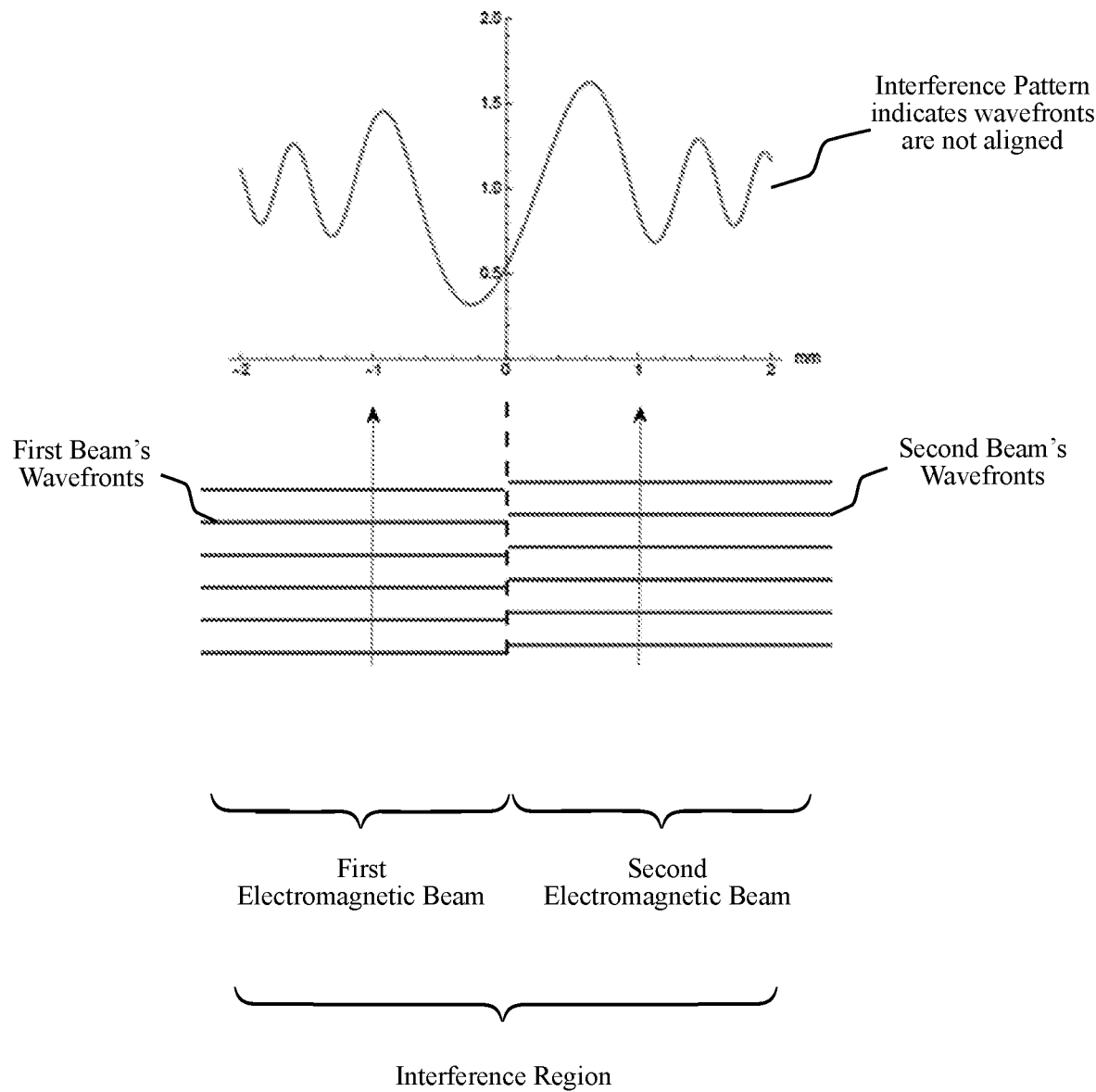
FIG. 6 illustrates an interference pattern in a wavefront for two electromagnetic beams with a phase difference of 1.5 radians according to some aspects.

FIG. 6 illustrates an interference pattern in a wavefront for two electromagnetic beams with a phase difference of 1.5 radians according to some aspects. Here, the desired wavefront is flat, as can be seen in the flat wavefronts of the first electromagnetic beam and the second electromagnetic beam. The phase difference between the first electromagnetic beam and the second electromagnetic beam is 1.5 radians. As such the interference pattern varies as a function of position along the interference pattern line 407. When the desired wavefront is flat, then the intensity of the interference pattern may be given by:

$$I(x, D, \varphi) = \frac{1}{4}\left|1 + erf^*\left(C\frac{x}{x_0}\right) + e^{i\varphi}\left[1 - erf^*\left(C\frac{x}{x_0}\right)\right]\right|^2, \quad (1)$$

where $C = \frac{\sqrt{\pi}}{2}(1 - i)$, $x_0 = \sqrt{\frac{\lambda D}{2000}}$, $\lambda$ is the wavelength of the electromagnetic radiation in microns, and D is the propagation distance between z=0 and the detector array in millimeters; erf( ) is the error function and the superscript asterisk indicates complex conjugation. The wavefront is flat (has infinite curvature) at the location z=0. It has been observed experimentally that small changes in D do not result in substantial changes in the shape of interference pattern for laser beams such as those considered herein. As such, the equation may be used to produce a lookup table for calculating phase differences for embodiments such as that illustrated in FIG. 3. Alternatively, the lookup table can be produced empirically from values measured using an implementation.

Figure 7:
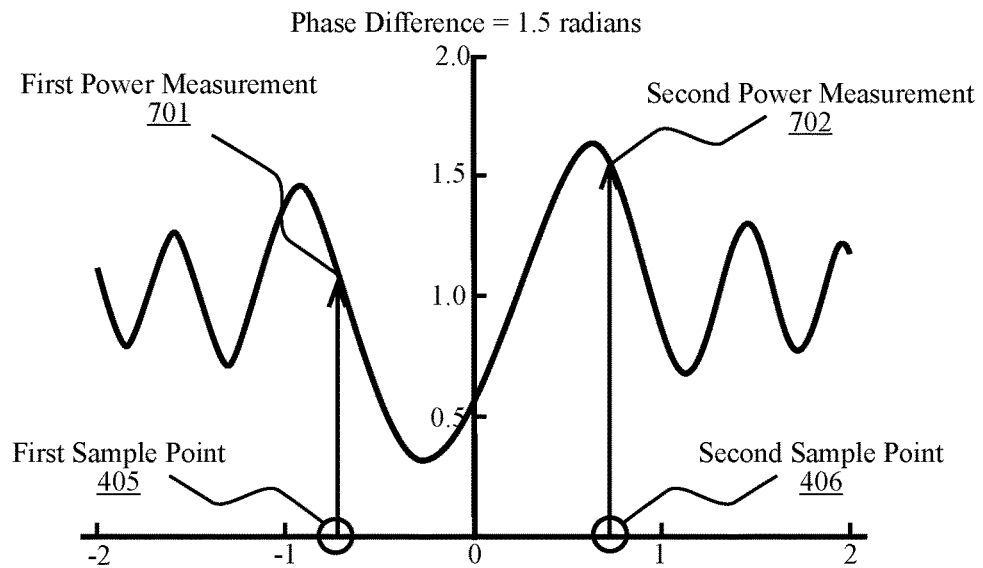
FIG. 7 illustrates obtaining a first power measurement at a first sample point and obtaining a second power measurement at a second sample point according to some aspects.

FIG. 7 illustrates obtaining a first power measurement 701 at a first sample point 405 and obtaining a second power measurement 702 at a second sample point 406 according to some aspects. Here, a first detector can produce the first power measurement 701 and a second detector can produce the second power measurement 702.

Figure 8:
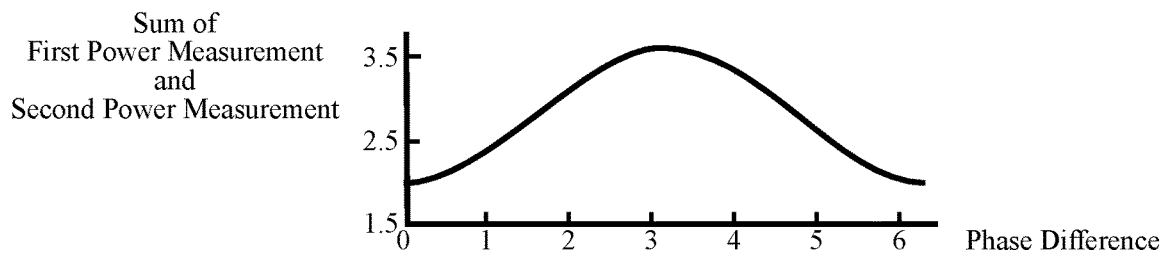
FIG. 8 illustrates a sum of the first power measurement and the second power measurement as a function of phase difference according to some aspects.
Figure 9:
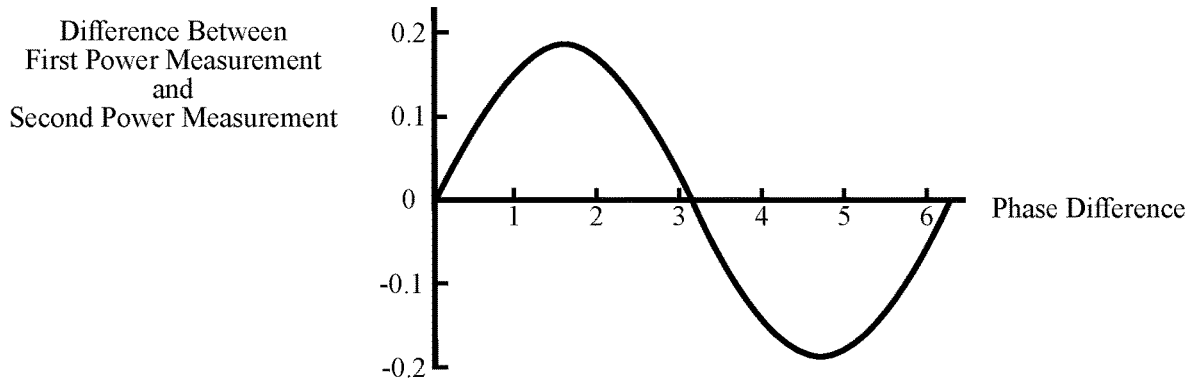
FIG. 9 illustrates a difference of the first power measurement and the second power measurement as a function of phase difference according to some aspects.

FIG. 8 illustrates a sum of the first power measurement 701 and the second power measurement 702 as a function of phase difference according to some aspects. The sum can be, for example, the second power measurement plus the first power measurement. FIG. 9 illustrates a difference of the first power measurement 701 and the second power measurement 702 as a function of phase difference according to some aspects. The difference can be, for example, the second power measurement minus the first power measurement. Inspecting the graphs of FIG. 8 and FIG. 9, it is seen that the phase difference can be determined using the sum and the difference. For example, the sign of the difference can indicate a phase difference range while the value of the sum can be mapped to a phase difference within the phase difference range. Furthermore, phase differences between $\frac{\pi}{2}$ and $\frac{3\pi}{2}$ radians can be determined using only the difference. These particular observed or calculated graphs for the sum and the difference are specific to the desired waveform, positions of the detectors, and geometry of the implementation.

Figure 10:
FIG. 10 illustrates graphs of interference pattern intensities for a number of different phase differences according to some aspects.

FIG. 10 illustrates graphs of interference pattern intensities for a number of different phase differences according to some aspects. Such graphs can be produced using values calculated via an equation such as equation 1 given above or via experimentation. Similar graphs can be produced for wavefronts that are not flat. For example, the desired wavefront can be curved or can be flat along a plane that is not normal to the direction of propagation.

Figure 11:
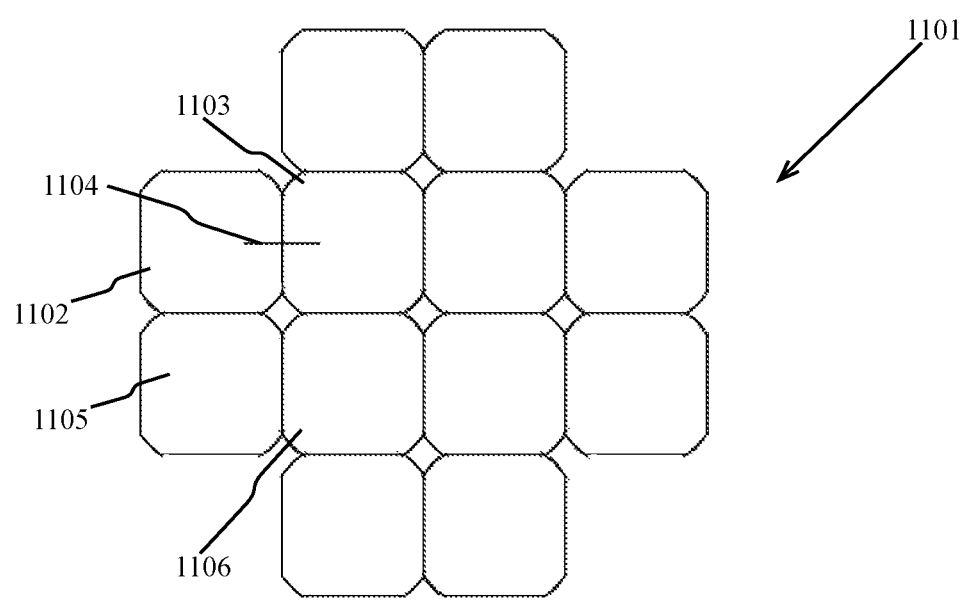
FIG. 11 illustrates an interference pattern line in an interference region between two beams according to some aspects.

FIG. 11 illustrates an interference pattern line 1104 in an interference region between two beams according to some aspects. Here, twelve sub-beams are being combined into a single combined beam 1101. In the pattern shown, there are sixteen boundaries between the twelve sub-beams. As such, there are sixteen interference regions. Sixteen phase differences, one for each interference region, can be determined using thirty-two power measurements, two measurements per interference zone. For example, the phase difference between a first electromagnetic beam 1102 and a second electromagnetic beam 1103 can be determined from two power measurements taken at sample points along the interference pattern line 1104. The phase differences can be used to determine the amounts by which to change the phase of each sub-beam. For example, the phase changes for the second electromagnetic beam 1103 and the third electromagnetic beam 1105 can be determined such that they have zero phase difference with the first electromagnetic beam 1102. Phase differences of the fourth electromagnetic beam 1106 relative to the second electromagnetic beam 1103 and the third electromagnetic beam 1105 can be determined and used to calculate a phase change such that the fourth electromagnetic beam 1106 has zero phase difference relative to the first electromagnetic beam 1102. Stepping through the rest of the sub-beams, phase changes can be determined such that every sub-beam has zero phase difference relative to the first electromagnetic beam 1102. After applying the phase changes via the phase changers 104, the combined beam may have the desired wavefront. The phase of the first electromagnetic beam may be changed such that the phase changes for all the electromagnetic beams are within the operational range of the phase changers.

Those practiced in algorithms or numerical analysis may choose other algorithmic means for determining the phase changes to be applied to the electromagnetic beams. For example, only eleven of the sixteen phase differences are required for the combined beam of FIG. 11, assuming the measurements and calculations are without error. All sixteen of the measurements can be used by, for example, an algorithm that attempts to minimize a total error. Those practiced in numerical analysis know of many algorithms that minimize a total error, a mean squared error, or some other error metric.

Figures 12, 13:
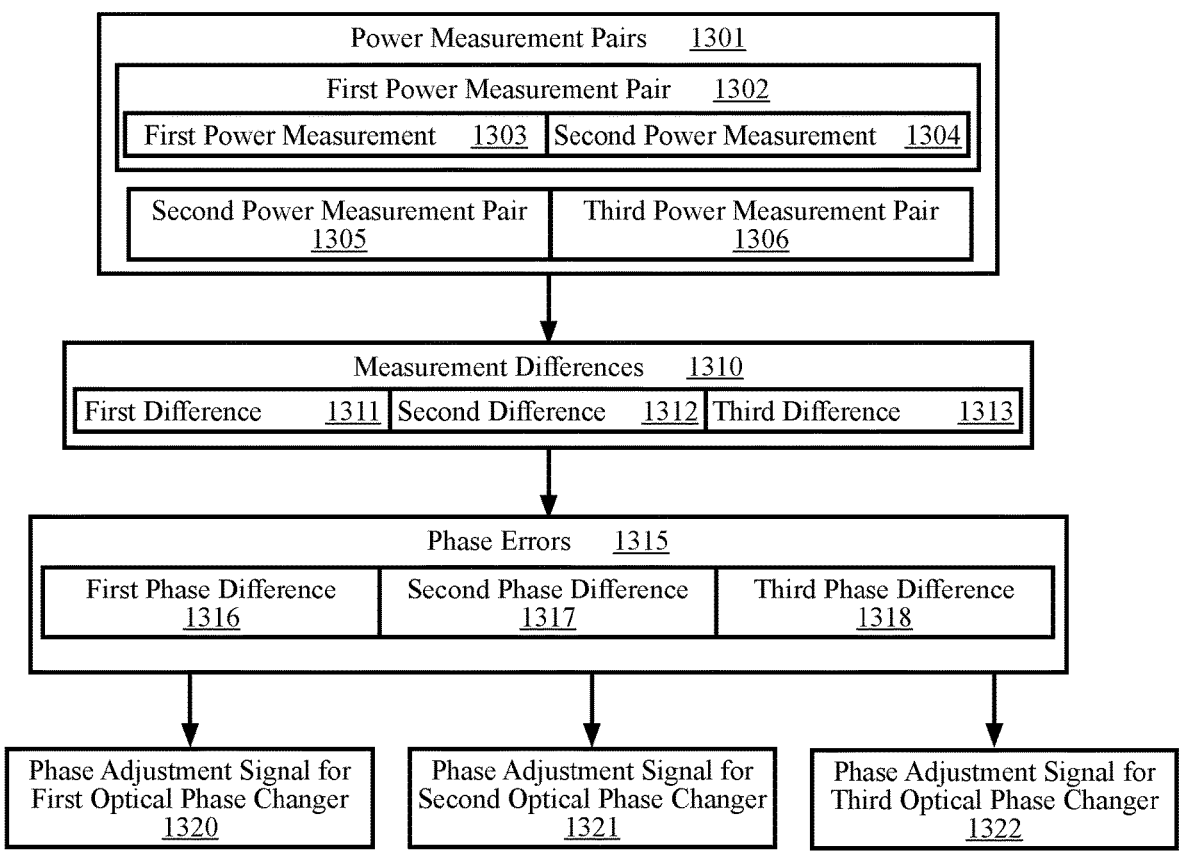
FIG. 12 illustrates a lookup table that can be used for determining phase differences from differences in measurement values according to some aspects.
FIG. 13 is a high-level diagram illustrating the production of phase adjustment signals for a combined beam that includes four electromagnetic beams according to some aspects.

FIG. 12 illustrates a lookup table 1201 that can be used for determining phase differences from differences in measurement values according to some aspects. A difference between two measurements can be calculated and a phase difference estimated using the closest measured value difference in the table, by interpolating between the two closest measured value differences in the table, etc.

FIG. 13 is a high-level diagram illustrating the production of phase adjustment signals for a combined beam that includes four electromagnetic beams according to some aspects. Power measurement pairs 1301 are measured using the detector array. The first power measurement pair 1302 includes a first power measurement 1303 and a second power measurement 1304. The first power measurement 1303 and the second power measurement 1304 can be taken at sample points such as a first sampling point 405 and a second sampling point 406. The power measurement pairs 1302 can also include a second power measurement pair 1305 and a third power measurement pair 1306. Measurement differences 1310 can be calculated. A first difference 1311 can be the second power measurement 1304 minus the first power measurement 1303. The second difference 1312 and the third difference 1313 can be similarly calculated from the second measurement pair 1305 and the third measurement pair 1306, respectively. Phase differences 1315 can be determined using the measurement differences 1310 via, for example, a lookup table. A first phase difference 1316 can be determined using the first difference 1311. A second phase difference 1317 can be determined using the second difference 1312. A third phase difference 1318 can be determined using the third difference 1313. Phase adjustments signals that can be passed to the phase changers can be determined based on the phase differences. The specific phase adjustment signal is dependent on the phase changer being used. Those practiced in optics and signal generation are familiar with generating inputs for phase changers. In this example, the phase of the fourth electromagnetic beam may be unchanged. As such, the phase adjustment signals include a phase adjustment signal for the first optical phase changer 1320, a phase adjustment signal for the second optical phase changer 1321, and a phase adjustment signal for the third optical phase changer 1322.

Figure 14:
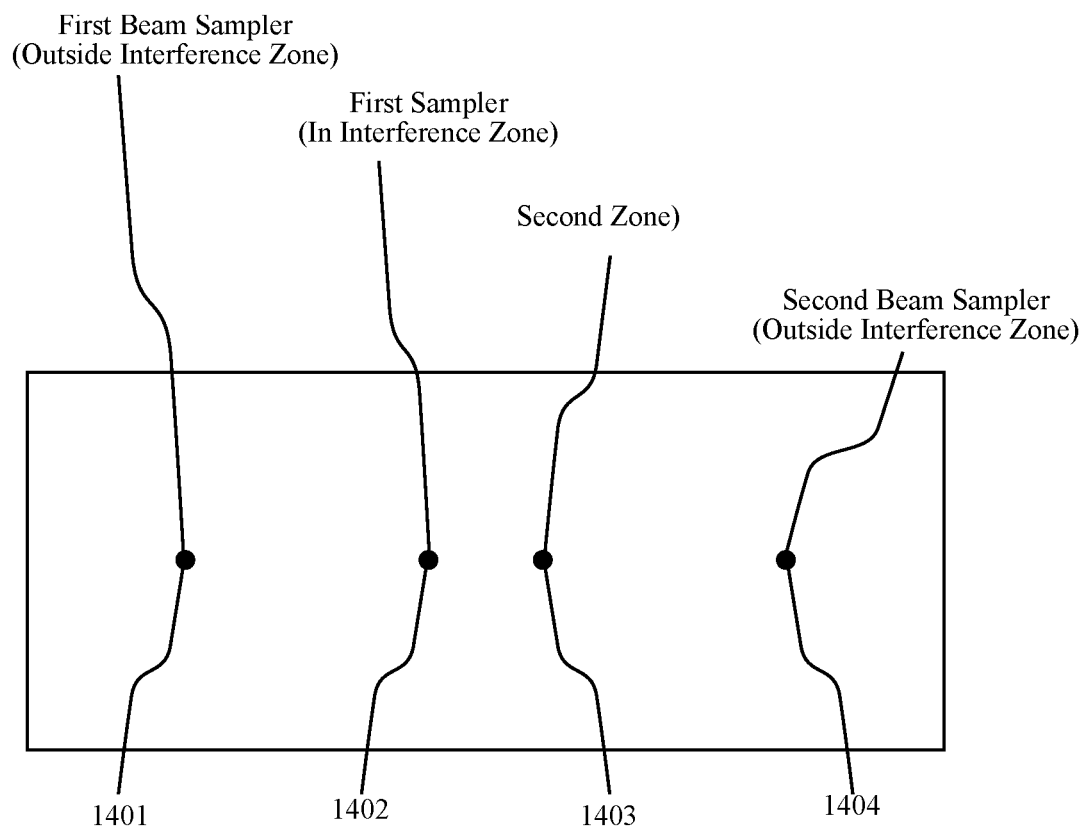
FIG. 14 illustrates one type of sampling optic that can be used for measuring beam strengths and interference according to some aspects.

FIG. 14 illustrates one type of sampling optic that can be used for measuring beam strengths and interference according to some aspects. Here, the sampling optic is a patterned sampling optic. The sampling optic has a first beam sampler 1401 that can direct a sampling beam to the detector array for measuring the power of the first electromagnetic beam. The first beam sampler 1401 can be outside the interference region. The sampling optic has a first sampler 1402 that can direct a sampling beam to the detector array for obtaining a first power measurement indicating a first combined power of the first electromagnetic beam and the second electromagnetic beam at a first sample point in the interference region. The sampling optic has a second sampler 1403 that can direct a sampling beam to the detector array for obtaining a second power measurement indicating a second combined power of the first electromagnetic beam and the second electromagnetic beam at a second sample point in the interference region. The sampling optic has a second beam sampler 1404 that can direct a sampling beam to the detector array for measuring the power of the second electromagnetic beam. The second beam sampler 1404 can be outside the interference region. The samplers can be partially reflective spots on a glass plate. Measurements of the power of the first electromagnetic beam and the second electromagnetic beam can be used to normalize or otherwise adjust the first power measurement and the second power measurement in cases of uneven amplification or sub-beam power. Alternatively, they can be used to adjust the amplifiers and thereby obtain even sub-beam power.

Figure 15:
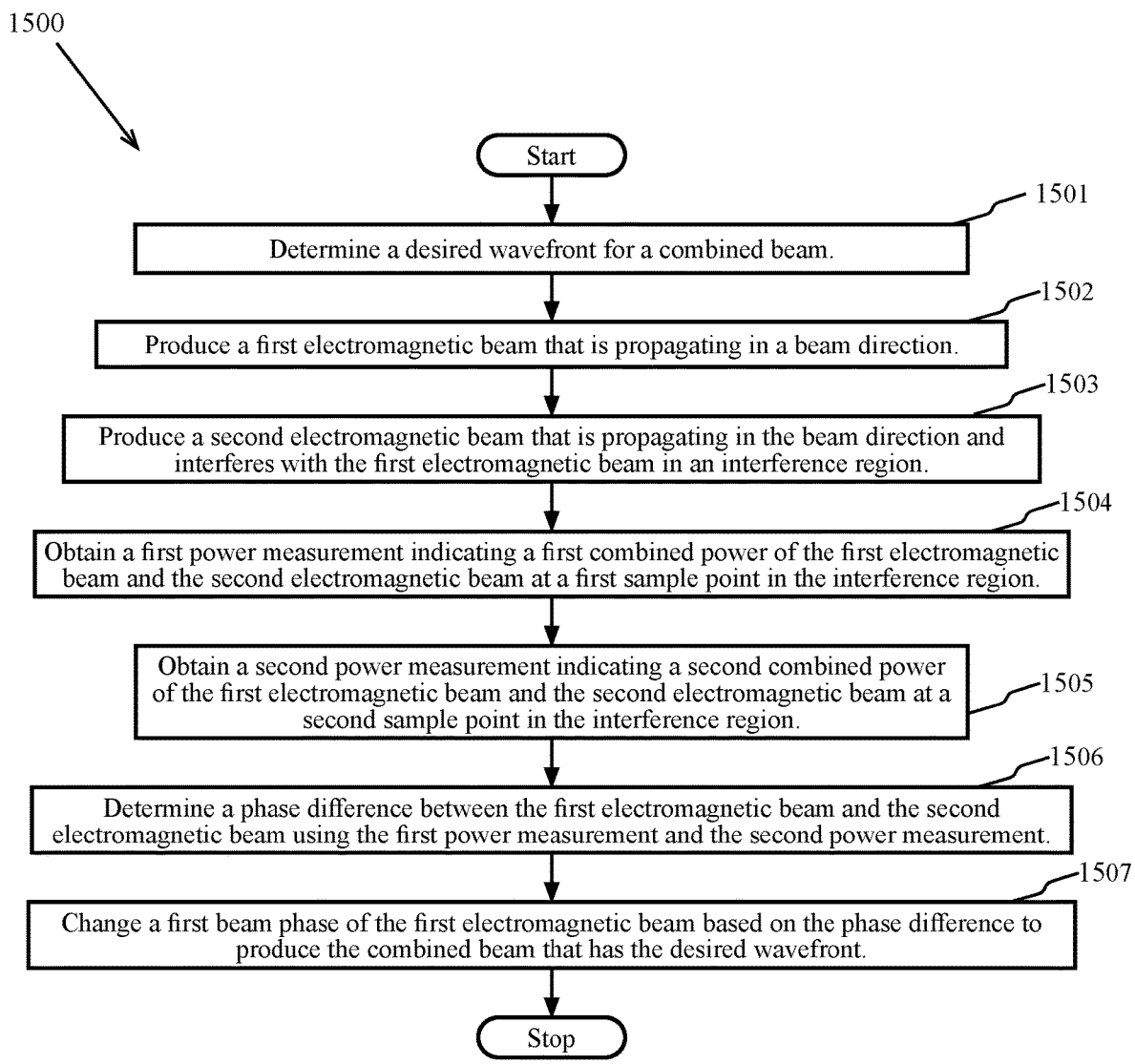
FIG. 15 is a high-level flow diagram illustrating a method for phase difference detection and control of electromagnetic arrays according to some aspects.

FIG. 15 is a high-level flow diagram illustrating a method for phase difference detection and control of electromagnetic arrays according to some aspects. At block 1501, the method can determine a desired wavefront for a combined beam. At block 1502, the method can produce a first electromagnetic beam that is propagating in a beam direction. At block 1503, the method can produce a second electromagnetic beam that is propagating in the beam direction and interferes with the first electromagnetic beam in an interference region. At block 1504, the method can obtain a first power measurement indicating a first combined power of the first electromagnetic beam and the second electromagnetic beam at a first sample point in the interference region. At block 1505, the method can obtain a second power measurement indicating a second combined power of the first electromagnetic beam and the second electromagnetic beam at a second sample point in the interference region. At block 1506, the method can determine a phase difference between the first electromagnetic beam and the second electromagnetic beam using the first power measurement and the second power measurement. At block 1507, the method can change a first beam phase of the first electromagnetic beam based on the phase difference to produce the combined beam that has the desired wavefront.

Although the operations of the method(s) herein are shown and described in a particular order, the order of the operations of each method may be altered so that certain operations may be performed in an inverse order or so that certain operations may be performed, at least in part, concurrently with other operations. Instructions or sub-opera-

What is claimed is:

1. A method for producing a combined beam that has a desired wavefront:
   producing a first electromagnetic beam that is propagating in a beam direction;
   producing a second electromagnetic beam that is propagating in the beam direction and interferes with the first electromagnetic beam to produce an interference pattern;
   obtaining a first power measurement from a first detector configured to measure the interference pattern at a first sample point in the interference pattern;
   obtaining a second power measurement from a second detector configured to measure the interference pattern at a second sample point in the interference pattern;
   determining a phase difference between the first electromagnetic beam and the second electromagnetic beam using the first power measurement and the second power measurement; and
   changing a first beam phase of the first electromagnetic beam based on the phase difference to produce the combined beam that has the desired wavefront.

2. The method of claim 1 wherein the phase difference is determined by subtracting the first power measurement from the second power measurement or by subtracting the second power measurement from the first power measurement.

3. The method of claim 1 further including:
   splitting an input signal to produce a first seed signal and a second seed signal;
   amplifying the first seed signal to produce the first electromagnetic beam; and
   amplifying the second seed signal to produce the second electromagnetic beam.

4. The method of claim 1 further including:
   splitting an input coherent light signal to produce a first seed signal and a second seed signal;
   amplifying the first seed signal to produce the first electromagnetic beam; and
   amplifying the second seed signal to produce the electromagnetic second beam.

5. The method of claim 4 further including:
   providing a phase adjustment signal based on the phase difference to an optical phase changer; and
   passing the first seed signal through the optical phase changer,
   wherein the optical phase changer changes a first seed signal phase of the first seed signal.

6. The method of claim 4, further including
   determining the phase difference in a single step using a single measurement pair that includes the first power measurement and the second power measurement.

7. The method of claim 1 further including:
   directing a sampling beam to the first detector and the second detector.

8. The method of claim 1 wherein:
   the first electromagnetic beam and the second electromagnetic beam are two of at least four electromagnetic beams propagating in the beam direction;
   a plurality of phase differences is determined based on a plurality of power measurement pairs; and
   at least three beam phases of the at least four electromagnetic beams are adjusted based on the phase differences to produce the combined beam with the desired wavefront.

9. A system comprising:
   beam forming optics configured to produce a first electromagnetic beam and a second electromagnetic beam that propagate in a beam direction and that produce an interference pattern;
   a first detector configured to obtain a first power measurement by measuring the interference pattern at a first sample point in the interference pattern;
   a second detector configured to obtain a second power measurement by measuring the interference pattern at a second sample point in the interference pattern;
   a processing device configured to use the first power measurement and the second power measurement to determine a phase difference between the first electromagnetic beam and the second electromagnetic beam; and
   a phase changer configured to produce a combined beam that has a predetermined wavefront by changing a first beam phase of the first electromagnetic beam based on the phase difference.

10. The system of claim 9 wherein the phase difference is determined by subtracting the first power measurement from the second power measurement or by subtracting the second power measurement from the first power measurement.

11. The system of claim 9 further including:
    a first amplifier configured to produce the first electromagnetic beam by amplifying a first seed signal obtained from an input signal; and
    a second amplifier configured to produce the second electromagnetic beam by amplifying a second seed signal obtained from the input signal.

12. The system of claim 9 further including:
    a first amplifier configured to produce the first electromagnetic beam by amplifying a first seed signal obtained from an input coherent light signal; and
    a second amplifier configured to produce the second electromagnetic beam by amplifying a second seed signal obtained from the input coherent light signal.

13. The system of claim 12 wherein the phase changer is an optical phase changer configured for changing the first beam phase using a phase adjustment signal based on the phase difference.

14. The system of claim 9:
    the phase difference is determined from a single measurement pair that includes the first power measurement and the second power measurement.

15. The system of claim 9 further comprising a sampling optic configured to direct a sampling beam to the first detector and to the second detector.

16. The system of claim 9 wherein:
    at least four electromagnetic beams propagating in the beam direction are produced;
    the first electromagnetic beam and the second electromagnetic beam are two of the at least four electromagnetic beams;
    a plurality of phase differences is determined based on a plurality of power measurement pairs; and
    at least three beam phases of the at least four electromagnetic beams are adjusted based on the phase differences to produce the combined beam.

17. A system comprising:
a means for producing a first electromagnetic beam and a second electromagnetic beam configured to produce an interference pattern;
a means for obtaining a first power measurement by measuring the interference pattern at a first sample point in the interference pattern;
a means for obtaining a second power measurement by measuring the interference pattern at a second sample point in the interference pattern;
a means for using the first power measurement and the second power measurement to determine a phase difference between the first electromagnetic beam and the second electromagnetic beam; and
a means for using the phase difference to produce a combined beam that has a predetermined wavefront and that includes the first electromagnetic beam and the second electromagnetic beam.

18. The system of claim 17 further including a means for amplifying a plurality of seed signals to produce a plurality of electromagnetic beams, wherein the first electromagnetic beam and the second electromagnetic beam are two of the electromagnetic beams.

19. The system of claim 17 wherein the first electromagnetic beam is a laser beam and the second electromagnetic beam is another laser beam.

20. The system of claim 17 wherein the phase difference is determined from a single measurement pair that includes the first power measurement and the second power measurement.

* * * * *